United States Patent
Graham et al.

(10) Patent No.: US 8,635,928 B2
(45) Date of Patent: Jan. 28, 2014

(54) ROBOT WITH A DEPLOYMENT APPARATUS FOR AN ARM COMPRISING A PLURALITY OF LINKS

(75) Inventors: Andrew Crispin Graham, Bristol (GB); Robert Oliver Buckingham, Abingdon (GB)

(73) Assignee: Oliver Crispin Robotics Limtied (GB)

( * ) Notice: Subject to any disclaimer, the term of this patent is extended or adjusted under 35 U.S.C. 154(b) by 250 days.

(21) Appl. No.: 12/908,570

(22) Filed: Oct. 20, 2010

(65) Prior Publication Data
US 2011/0067519 A1    Mar. 24, 2011

Related U.S. Application Data

(63) Continuation of application No. PCT/GB2009/000997, filed on Apr. 20, 2009.

(30) Foreign Application Priority Data

Apr. 22, 2008 (GB) ...................................... 0807330

(51) Int. Cl.
*B25J 17/00*    (2006.01)
*B25J 17/02*    (2006.01)
*B25J 18/00*    (2006.01)

(52) U.S. Cl.
USPC .......................................... 74/490.04; 901/21

(58) Field of Classification Search
USPC ................... 74/490.04; 901/21, 46
See application file for complete search history.

(56) References Cited

U.S. PATENT DOCUMENTS

| | | | |
|---|---|---|---|
| 980,181 A * | 1/1911 | Asbury | 89/47 |
| 3,234,698 A * | 2/1966 | Kimblern | 52/108 |
| 4,719,840 A * | 1/1988 | Goodell et al. | 89/47 |
| 5,271,182 A * | 12/1993 | Greisner et al. | 49/325 |
| 5,355,643 A * | 10/1994 | Bringolf | 52/108 |
| 8,011,260 B2 * | 9/2011 | Scott et al. | 74/89.2 |
| 2001/0029406 A1 | 10/2001 | Okamoto et al. | |
| 2002/0032365 A1* | 3/2002 | Hasegawa et al. | 600/102 |
| 2007/0158504 A1 | 7/2007 | Burlot | |
| 2008/0199295 A1* | 8/2008 | Scott et al. | 414/744.1 |

FOREIGN PATENT DOCUMENTS

| | | | |
|---|---|---|---|
| DE | 3605133 A1 | | 8/1986 |
| FR | 2825655 A1 | | 12/2002 |
| GB | 2171076 A | * | 8/1986 |
| JP | 2221010 A | | 9/1990 |
| JP | 11244225 A | | 9/1999 |
| JP | 2000089131 A | | 3/2000 |
| SU | 1484722 A1 | | 6/1989 |

(Continued)

OTHER PUBLICATIONS

International Search Report; PCT/GB2009/000997; Sep. 7, 2009; 3 pages.

(Continued)

*Primary Examiner* — Justin Krause
(74) *Attorney, Agent, or Firm* — St. Onge Steward Johnston & Reens LLC

(57) ABSTRACT

A robotic arm deployment apparatus is provided for a tip following robotic arm, of the type comprising a plurality of controllable segments (34) each comprising articulated links. The apparatus includes a straight guide portion (16) having a length at least equal to the length of each arm segment so that the arm control system can be calibrated as each segment passes through the guide.

8 Claims, 9 Drawing Sheets

(56) References Cited

FOREIGN PATENT DOCUMENTS

| WO | 03017858 A1 | 3/2003 |
| WO | 2006136827 A1 | 12/2006 |
| WO | 2007109739 A1 | 9/2007 |

OTHER PUBLICATIONS

United Kingdom Search Report; Application No. GB0807330.6; May 28, 2008; 1 page.

\* cited by examiner

ROBOT WITH A DEPLOYMENT APPARATUS FOR AN ARM COMPRISING A PLURALITY OF LINKS

CROSS-REFERENCE TO RELATED APPLICATIONS

The present application is a continuation of pending International patent application PCT/GB2009/000997 filed on Apr. 20, 2009, which designates the United States and claims priority from United Kingdom patent application 0807330.6 filed Apr. 22, 2008.

FIELD OF THE INVENTION

This invention relates to robotic arm deployment apparatus, and to the calibration and initialisation of robotic arms.

BACKGROUND OF THE INVENTION

A known type of robotic arm is used in path following or tip following applications. Such an arm may be caused to advance into an environment along a required path, for example avoiding obstacles, with the body of the arm remaining close to that path along its length. Such an arm commonly comprises a plurality of sequentially arranged articulated links. Actuators comprising control cables may be used to control the position of control links which are positioned at intervals along the length of the arm. For example, there may be three cables associated with each control link. The control links each define the end of a segment in which the remaining links are passive, and take up a continuously curved shape between adjacent control links. Thus the shape of the body of the arm can be controlled.

With such an arrangement, the actuators may also comprise a motor with an encoder to pull in or pay out each cable as required to control the position of the control link concerned. A computer control system may communicate with the encoders for this purpose. For example, the control cables may each be wound on to a spool. When first constructed, the arm needs to be initialised, with the encoders set to correspond to a known position of the arm. For this purpose, it may be possible to allow the arm to hang down vertically, in which case it may be assumed that the arm is straight. The control cables may then be wound to predefined tensions, and the motor encoders may be set to "zero" or "straight". The arm may then be packaged for use, for example being wound onto a reel inside a deployment housing.

The process of "zeroing" the encoders may need to be repeated after a certain period of use to calibrate the arm because of hysteresis errors. However, it may be inconvenient or impossible to allow the arm to hang down or otherwise to constrain the arm into a straight position when it has been packaged for use. Thus it has previously been necessary for the arm to be taken out of service and removed from the housing in order to calibrate it.

SUMMARY OF THE INVENTION

This invention aims to provide a robotic arm deployment apparatus which may also be used to initialise or calibrate the arm.

According to the present invention there is provided a robotic arm deployment apparatus comprising an arm mounted to a housing, the arm comprising a plurality of segments, each segment comprising a plurality of articulated links arranged sequentially along the arm; and an actuator having a control arrangement associated therewith for controlling the position of at least one of the links in each segment; a deployment path for the arm being defined in the housing, and a guide being arranged along the deployment path, the guide being adapted to constrain the arm within the guide to a straight configuration, and the guide having a length which is at least equal to the length of each segment of the arm.

Thus, as each segment passes into the guide, it is known that the segment is straight, and the control arrangement for that segment can be set or "zeroed" accordingly. The actuators may for example comprise control cables, the length of which are varied by motors. The control arrangement may comprise an encoder associated with each motor for connection to a computer control system. The segments are conveniently of equal length.

The guide may also be arranged to constrain the arm rotationally such that it is also known that the segment within the guide is not twisted. This obviates any error associated with the wire length change due to twisting, and so has the advantage that the calibration can be more accurate. A further advantage is that the guide may support torsional loads on the arm when deployed.

The invention also comprises a method of calibrating a robotic arm in a deployment apparatus as defined above, comprising deploying the arm such that a first segment is constrained within the guide, adjusting the actuator for that segment to maintain the segment in a straight configuration, setting the control arrangement to correspond to the straight position, and repeating these steps for subsequent segments and setting the control arrangement to values representing the retracted arm shape as defined by the deployment path.

For example, the deployment path may be defined by a helical or hose-reel shaped former in the housing on which the arm is mounted. Alternatively the arm may be stored in a looped shape, where the shape of the loop is defined by a former, or where the loop is unconstrained. The arm may also be equipped with shape measurement sensors, such that the actual shape of the arm is known.

The arm may include an indicator for indicating the length of arm which has been deployed from the housing. Such an indicator may comprise a visual display on the housing, or markers on the arm itself. This has the advantage that it may clearly be seen when a complete segment has been deployed or retracted.

BRIEF DESCRIPTION OF THE DRAWINGS

In order that the invention may be more readily understood, reference will now be made to the accompanying drawings, in which.

DETAILED DESCRIPTION OF THE INVENTION

Figure 1A:
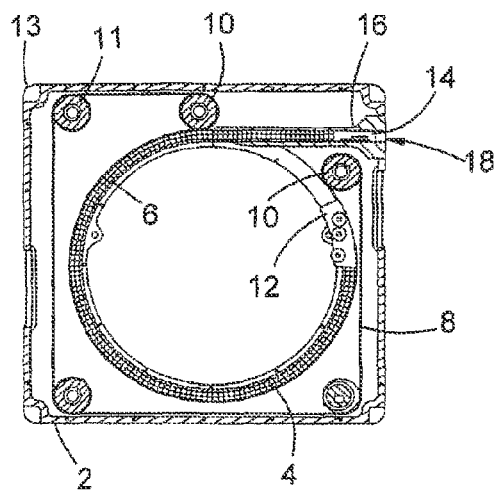
FIG. 1a is a schematic cross-sectional side view of a deployment apparatus and arm in accordance with the present invention.
Figure 1B:
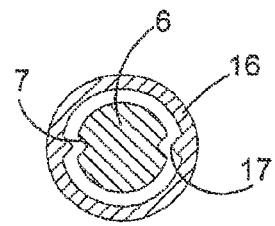
FIG. 1b is a cross-section view of the guide portion and arm of FIG. 1.
Figure 2:
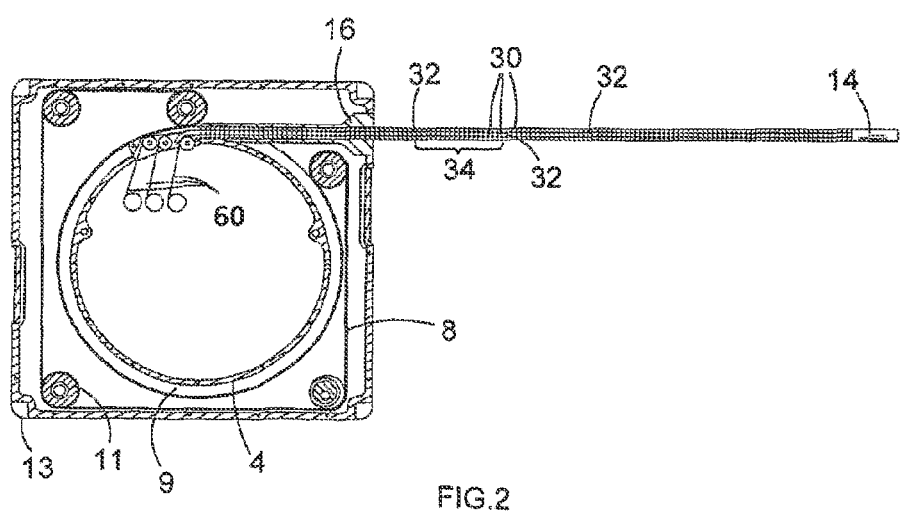
FIG. 2 is a further cross-sectional side view of the apparatus of FIG. 1 with the arm extended.
Figure 3:
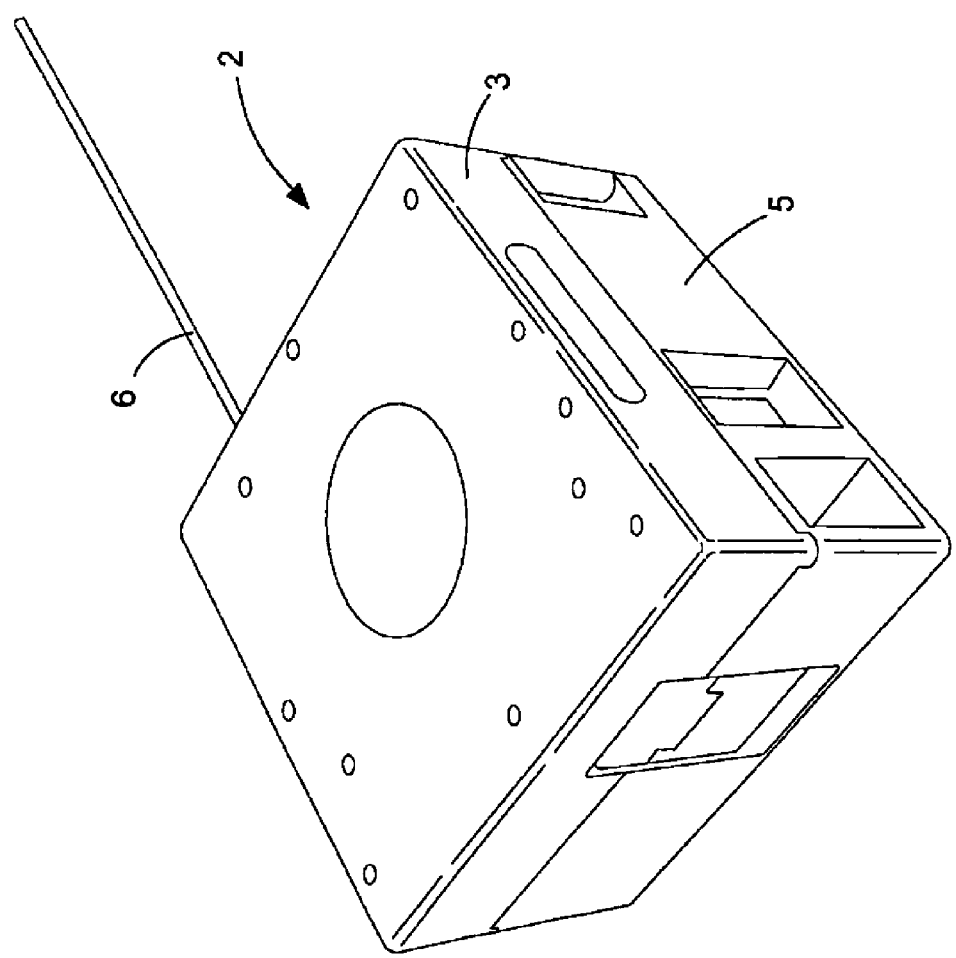
FIG. 3 is a schematic perspective view of the apparatus of FIGS. 1 and 2 with the arm extended.

Referring now to FIGS. 1a, 1b and 2, the deployment apparatus comprises a housing 2 in the form of a box comprising upper and lower cover parts 3, 5 fitted together, as can more clearly be seen from FIG. 3. Mounted inside the housing 2 is a reel 4 which is rotatable in the housing and mounts an arm 6. The arm 6 is of the "tip following" type, and comprises a plurality of sequentially arranged articulated links 30. The shape of the arm 6 is controllable using control links 32 distributed along the length of the arm. The control links 32 each define the end of a segment 34 which can be moved into a curved shape between adjacent control links 32 by controlling the orientation of each control link 32. Thus the arm may be controlled to adopt a serpentine shape.

The arm 6 is constrained in a recess 9 in the outer edge of the reel 4, which thus defines the deployment path, by a restraining belt 8 mounted on a series of pulleys or wheels 10, 11. A pair of the wheels 10 are positioned each immediately adjacent the reel 4 with the belt 8 extending around the reel 4 between them, such that the belt 8 sandwiches the arm 6 between the belt 8 and recess 9 of the reel 4 to restrain the arm in the recess 9. The remainder of the belt 8 returns around the edge of the housing on further wheels 11 positioned at the corners 13 of the housing.

The base or proximal portion 12 of the arm 6 is attached to the reel 4, and the distal or tip portion 14 of the arm 6 leaves the recess 9 and passes into a guide section 16, which further defines the deployment path. The guide 16 is a straight tube sized to closely receive the arm 6 and has an opening 18 to the exterior of the housing 2 for deploying the arm 6 out of the housing. Thus the arm 6 may be deployed through the guide 16 when the reel 4 turns in the clockwise direction, as can be seen from FIG. 2.

The guide 16 may have one or more ridges 17 running along the inside thereof to engage in recesses 7 in the arm 6, such that the arm is substantially prevented from twisting with respect to the guide, as shown in FIG. 1b.

Figure 4:
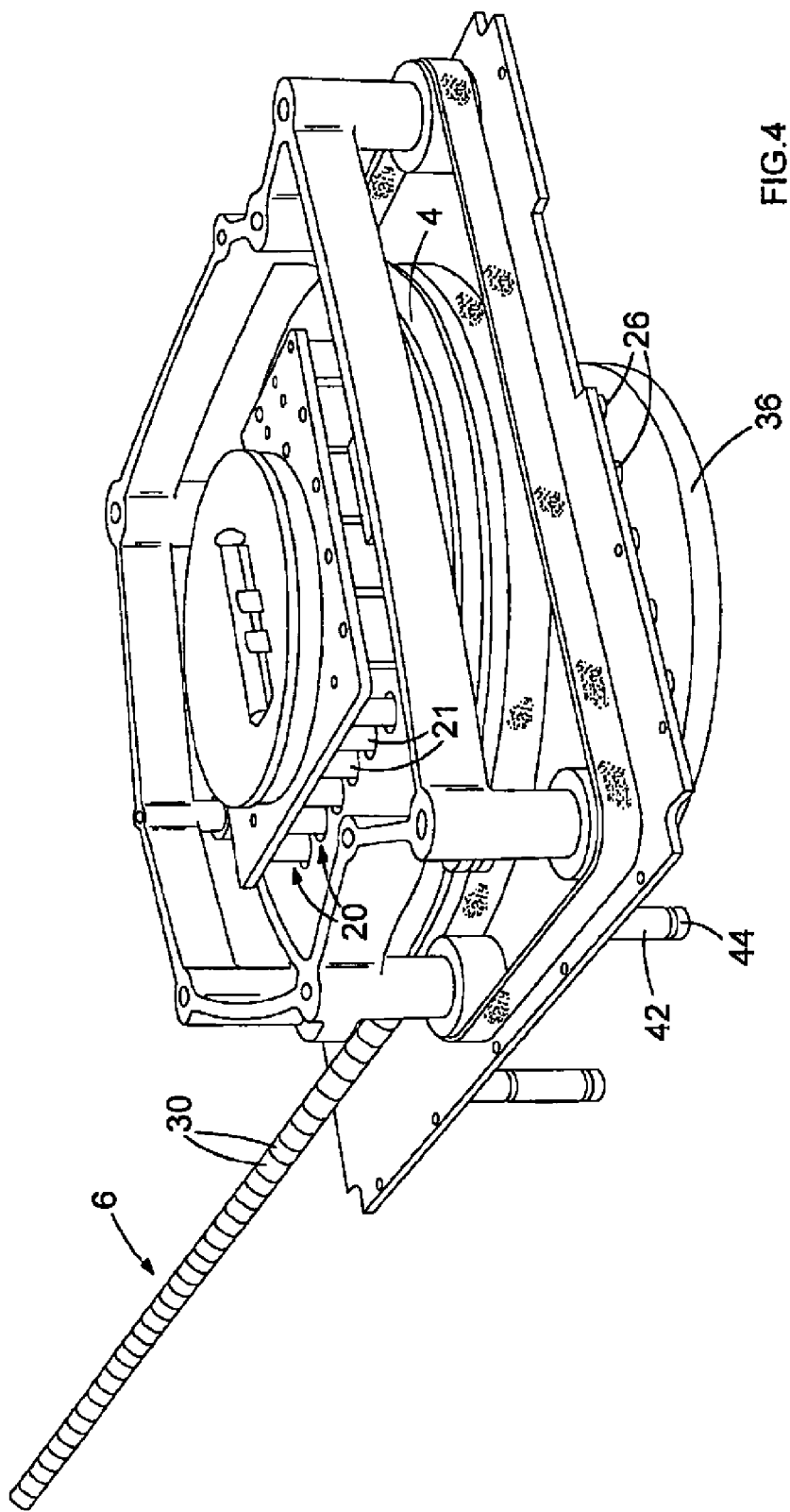
FIG. 4 is a perspective view of the apparatus of FIG. 3 with part of the housing removed.
Figure 7:
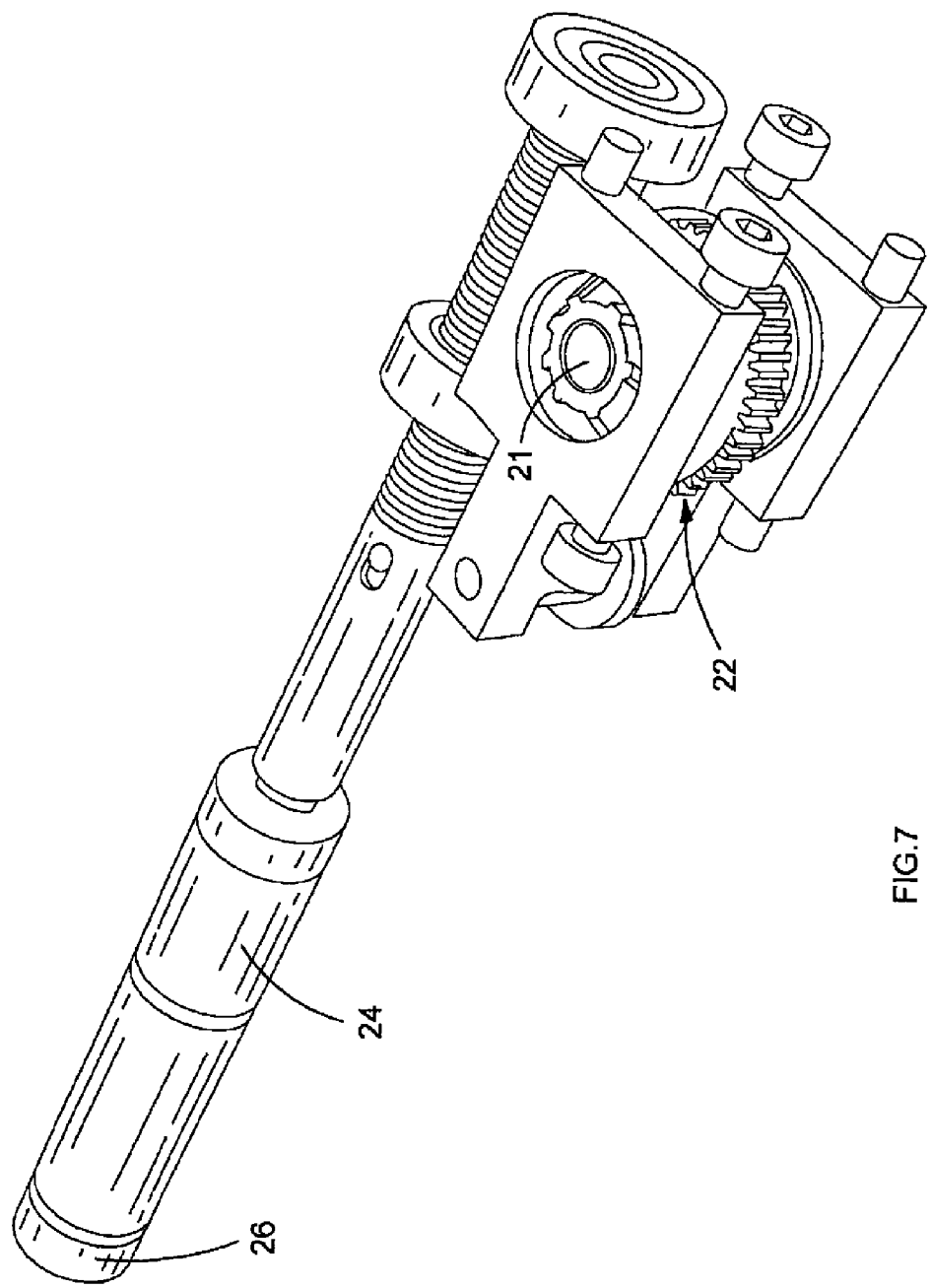
FIG. 7 is a perspective view of a motor actuator suitable for use with the apparatus.

From FIG. 4, it can be seen that an array of actuators is provided adjacent the reel 4. Referring also to FIG. 7, the actuators are substantially tubular in shape, and extend axially of the reel 4. The actuators each comprise a spool 21 on which a control cable 60 associated with the arm 6 is wound. Each spool 21 may be turned to control the length of the associated control cable by a motor 24. Each motor 24 is connected to an encoder 26 for control by a computer control system. For example, each control segment may have three control cables running out of the base of the arm 6, into the reel 4, and each being routed to one of the array of spools 21.

Figure 5:
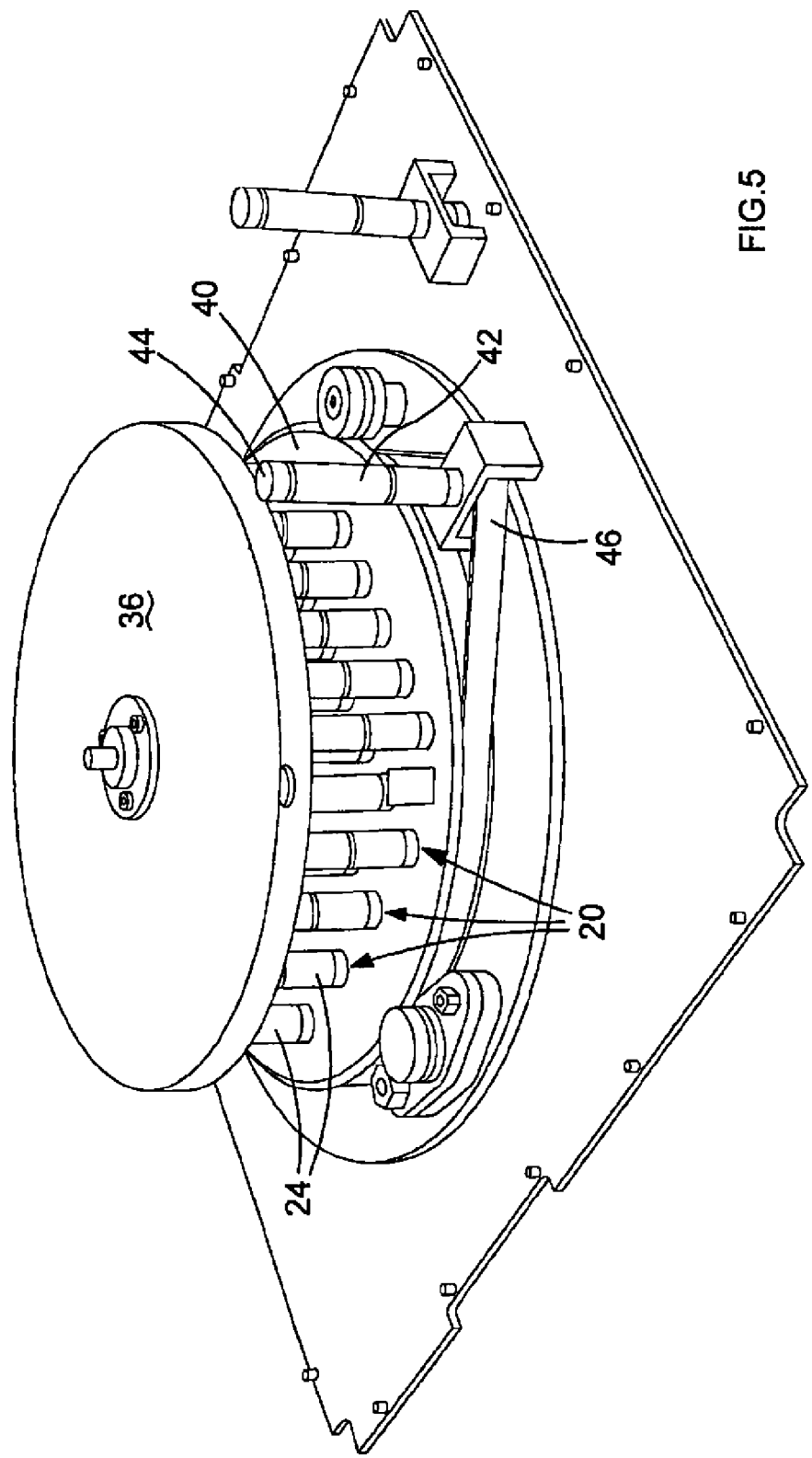
FIG. 5 is a further perspective view of the apparatus of FIG. 4 from the other side.
Figure 6:
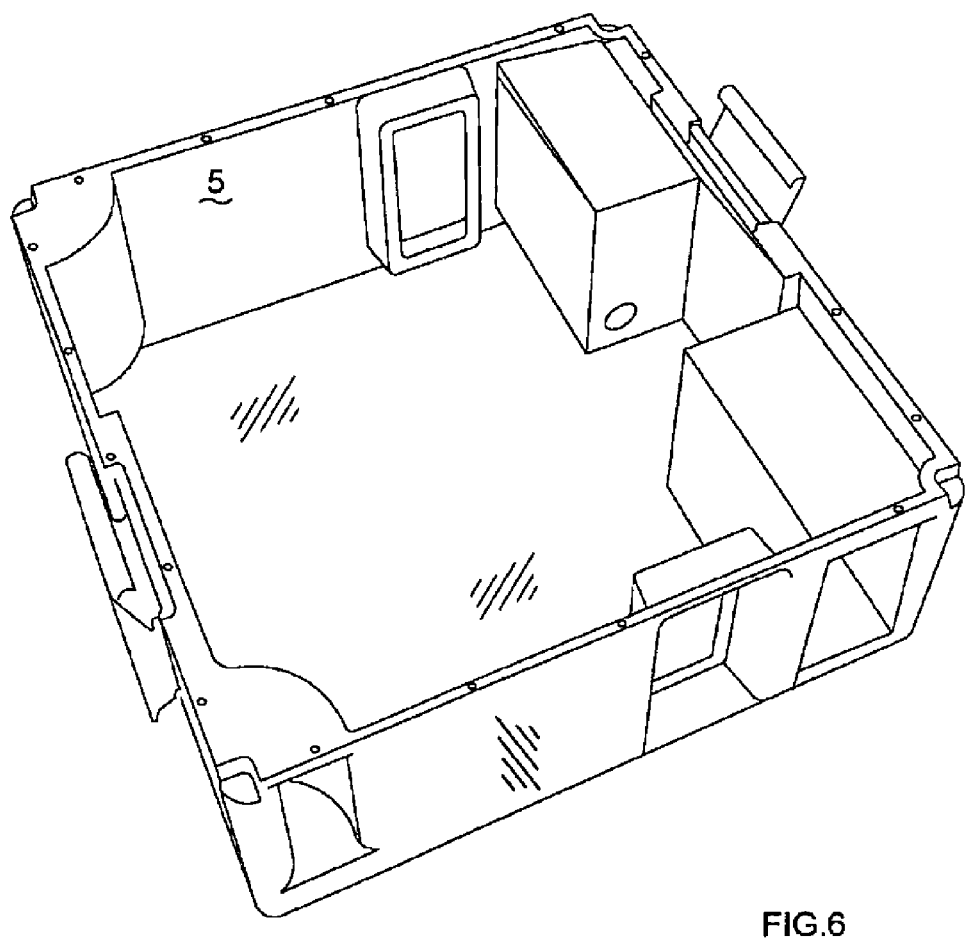
FIG. 6 is a perspective view of a housing part for the apparatus of FIGS. 4 and 5.

Referring also to FIG. 5, the spools 21 are each attached, via a gearing system 22 to the associated motor 24 and the encoder 26. It can be seen that the encoders 26 present an array of electrical connections for connection with the control system, for example via a printed circuit board which may be mounted adjacent a disc 36 just inside the lower cover 5. A drive wheel 40 is mounted coaxially with the arm reel 4 for rotation therewith. A belt motor 42 is operable via an encoder 44 (for connection to the computer control system) to rotate in order to drive a rotation belt 46. The rotation belt 46 engages the drive wheel 40 to rotate it, such that the arm reel 4, together with the actuators 20 turn as one unit.

In use, to deploy the arm 6, the belt motor 42 is operated to turn the rotation belt 46. Thus the reel 4 and the arm 6 are turned in the clockwise direction, such that the tip 14 of the arm emerges from the aperture 18 in the guide 16. Once a segment of the arm 6 has emerged from the aperture 18, its shape may be controlled by operation of the motors 24 associated with the control cables for the control link 32 at the end of that segment. The shape of the arm 6 controlled by the actuation motors 24, is coordinated with the advancement of the arm 6 controlled the drive motor 42 by the computer control system to achieve a "tip following" motion.

Calibration or initialisation of the arm 6 may take place as follows. With the arm in the extended position, shown in FIG. 2, the base or proximal segment of the arm is constrained within the guide 16. It is therefore known that the most proximal segment is in a straight configuration. Thus the motors 24 may be operated to wind the control cables associated with the most proximal segment to a predetermined tension so as to hold the segment straight. It is then known that this position of the motors 24 corresponds to a straight configuration, and the encoders 26 may be programmed accordingly, or "zeroed".

The belt motor 42 may then be operated further to move the rotation belt 46 such that the arm 6 is retracted into the housing 2, and the next most proximal segment is contained within the guide 16. In this position, the next set of control cables corresponding to that segment may be wound to a predetermined tension using the actuators 20. In this position, it is known that the segment concerned is straight, and that the adjacent segment is located along the deployment path in a known shape, and therefore the shape of the arm along the length of the associated control cables is known. Thus the encoders can be set accordingly.

This process may be repeated for each segment of the arm until the arm is completely retracted. The actuators and control system are then calibrated and/or initialised and ready for use. It will be appreciated that the calibration process may take place without removing the covers 3,5 of the housing 2.

Calibration may also take place during operation of the arm. The tension in the control cables associated with a segment passing through the guide 16 may be monitored or adjusted to ensure the arm remains correctly calibrated.

Figure 8A:
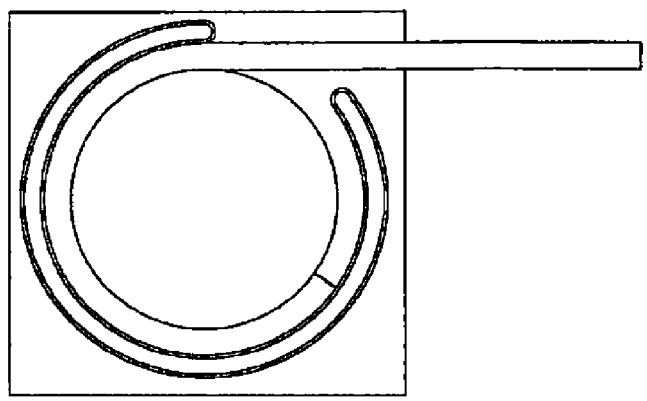
FIGS. 8a and 8b are schematic side cross-sectional views showing different arm stowage configurations.
Figure 8B:
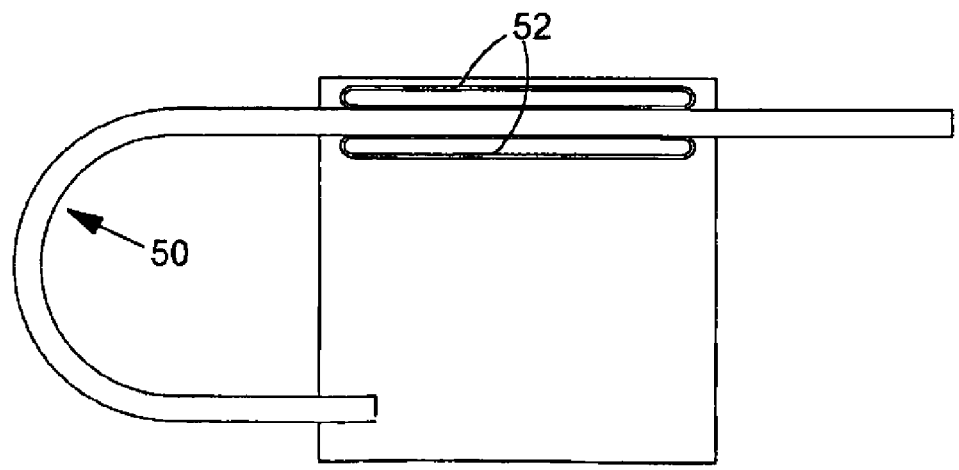

Referring now to FIGS. 8a and 8b, as an alternative to the "hose reel" arm stowage positions already shown, and schematically shown in FIG. 8a, the arm 50 may be stowed in a loop configuration as shown in FIG. 8b. In this case, the restraining belt arrangement may for example comprise two linearly arranged belts 52 mounted on either side of the arm 50, which may be associated with the guide portion.

Figure 9:
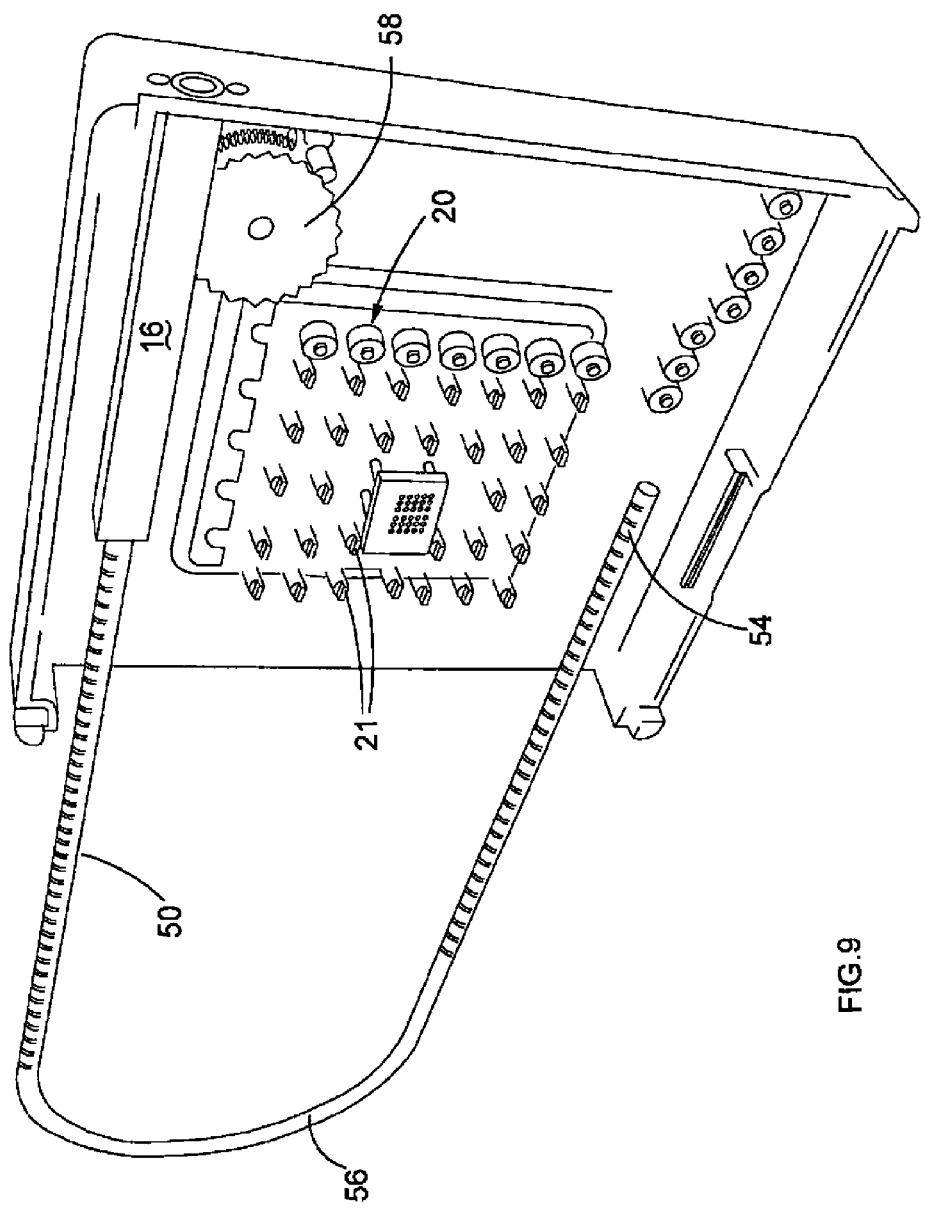
FIG. 9 is a perspective view of an apparatus according to another embodiment of the invention.
Figure 10:
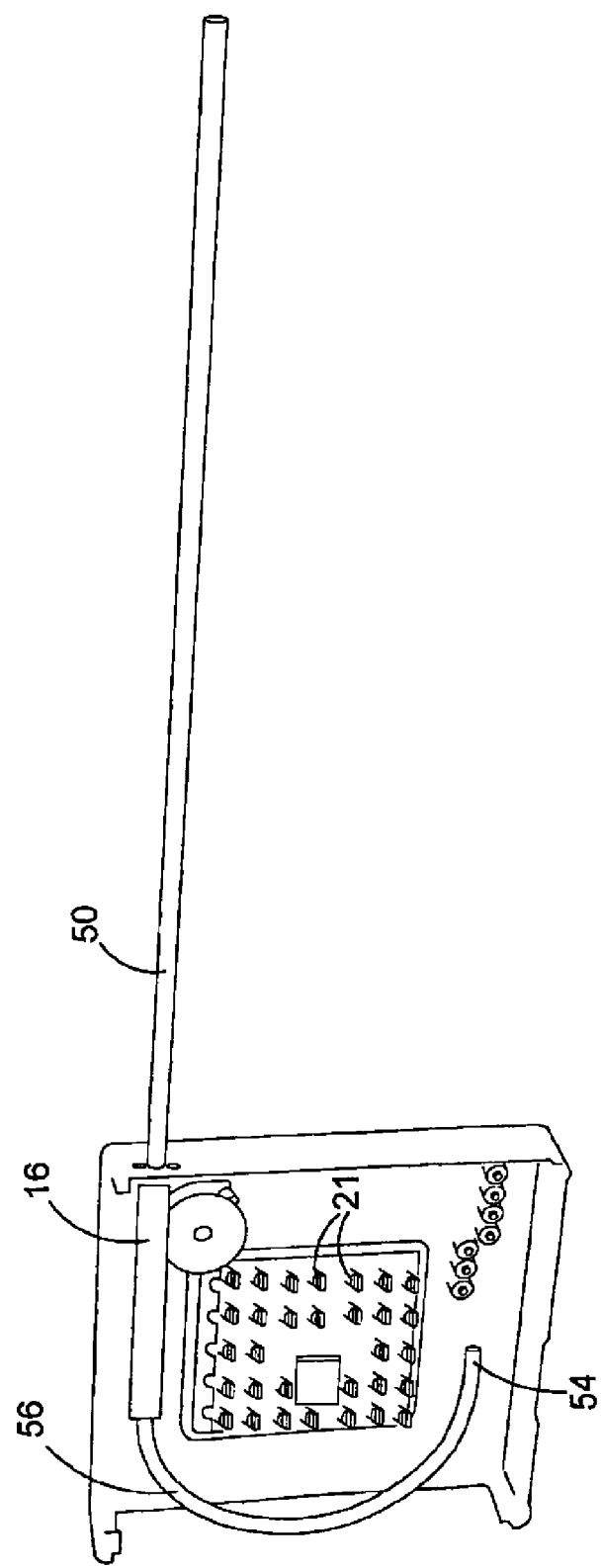
FIG. 10 is a perspective view of the apparatus of FIG. 9 with the arm extended.

Referring to FIG. 9 and FIG. 10, when the arm is used in a looping format, the actuators 20 do no need to rotate with the arm 50 as it advances. Control cables from the spools 21 pass into the fixed base portion 54 of the arm 50. The loop 56 of the arm 50 may be constrained (for example on a former) or remain unconstrained as shown. The loop of arm may be entirely planar and the length of control cables within the loop may be known. The drive mechanism may be in the form of a toothed wheel 58 which engages directly with features on the links 30 of the arm (not shown) or indirectly via an advance belt driven by a motor, similar to that shown in FIG. 5. These features may be associated with the guide 16.

What is claimed is:

1. A robotic arm deployment apparatus comprising:
   a housing and an arm mounted to the housing, the arm having a deployment path defined in the housing along which the arm can be deployed or retracted with respect to the housing, the arm comprising at least a first segment and a second segment, wherein the first and second segments respectively comprise a plurality of articulated links arranged sequentially along the arm;
   a first actuator having a first set of control cables operatively connected to a link in the first segment wherein the first actuator is operable to adjust the lengths of the first set of control cables, thereby to control the orientation of the link in the first segment;
   a second actuator having a second set of control cables operatively connected to a link in the second segment, wherein the second actuator is operable to adjust the lengths of the second set of control cables, thereby to control the orientation of the link in the second segment; and
   a guide arranged along the deployment path, the guide being adapted to constrain the arm within the guide to a straight configuration, and the guide having a length which is at least equal to the length of the first or second segments, wherein the first and second actuators are configured respectively to adjust the lengths of the first and second sets of control cables so that the first and second sets of control cables are at a predetermined tension when the first and second segments respectively are constrained to a straight configuration by the guide.

2. The robotic arm deployment apparatus of claim 1, wherein the actuator comprises an encoder associated with each control cable for connection to a computer control system.

3. The robotic arm deployment apparatus of claim 1, wherein the segments are of equal length.

4. The robotic arm deployment apparatus of claim 1, in which the guide is arranged to constrain the arm rotationally.

5. The robotic arm deployment apparatus of claim 1, wherein the deployment path is defined by a helical former in the housing on which the arm is mounted.

6. The robotic arm deployment apparatus of claim 1, wherein the arm is equipped with shape measurement sensors.

7. The robotic arm deployment apparatus of claim 1, wherein the arm includes an indicator for indicating the length of arm which has been deployed from the housing.

8. A method of calibrating a robotic arm in a deployment apparatus comprising a housing and an arm mounted to the housing, the arm having at least a first segment and a second segment, wherein the first and second segments respectively comprise a plurality of articulated links arranged sequentially along the arm, a first actuator having a first set of control cables operatively connected to a link in the first segment wherein the first actuator is operable to adjust the lengths of the first set of control cables, thereby to control the orientation of the link in the first segment, a second actuator having a second set of control cables operatively connected to a link in the second segment, wherein the second actuator is operable to adjust the lengths of the second set of control cables, thereby to control the orientation of the link in the second segment, and a guide arranged along a deployment path, the guide being adapted to constrain the arm within the guide to a straight configuration, and the guide having a length which is at least equal to the length of the first or second segments, the method comprising:
   deploying the arm such that the first segment is constrained within the guide,
   operating the first actuator to adjust the lengths of the first set of control cables so that the first set of control cables are at a redetermined tension while the first segment is maintained in a straight configuration by the guide,
   retracting the first segment from the guide into the housing, and
   deploying the arm such that the second segment is constrained within the guide,
   operating the second actuator to adjust the lengths of the second set of control cables so that the second set of control cables are at a predetermined tension while the second segment is maintained in a straight configuration by the guide,
   retracting the second segment from the guide into the housing,
   wherein the method also involves operating the first and second actuators respectively to adjust the lengths of the first and second sets of control cables to represent the retracted arm shape as defined by the deployment path, when the first and second segments are retracted into the housing.

* * * * *